United States Patent
Geiss

(10) Patent No.: US 7,412,762 B2
(45) Date of Patent: Aug. 19, 2008

(54) METHOD AND DEVICE FOR INTRODUCING WEAKENED LINES INTO A COMPONENT RIGID PER SE

(75) Inventor: Manfred Geiss, Sesslach (DE)

(73) Assignee: Geiss AG, Sesslach (DE)

( * ) Notice: Subject to any disclaimer, the term of this patent is extended or adjusted under 35 U.S.C. 154(b) by 249 days.

(21) Appl. No.: 11/314,980

(22) Filed: Dec. 21, 2005

(65) Prior Publication Data

US 2007/0014646 A1 Jan. 18, 2007

(30) Foreign Application Priority Data

Feb. 22, 2005 (DE) .................. 10 2005 008 095

(51) Int. Cl.
*B23P 23/00* (2006.01)
*B23K 26/38* (2006.01)
*B23C 3/00* (2006.01)

(52) U.S. Cl. .............. 29/566; 29/56.5; 219/121.67; 219/121.82; 219/121.84; 219/121.75; 409/197; 409/199

(58) Field of Classification Search .......... 29/566, 29/50, 52, 53, 54, 55, 56.5; 219/121.62, 219/121.67, 121.68, 121.7, 121.71, 121.75, 219/121.83, 121.84, 121.85; 280/728.2, 280/728.3, 731, 732; 156/250; 264/46.5, 264/255, 302, 603; 409/131, 132, 135, 136, 409/197, 199; 408/1 R, 16, 22, 24, 26, 30, 408/701

See application file for complete search history.

(56) References Cited

U.S. PATENT DOCUMENTS

| | | | | |
|---|---|---|---|---|
| 5,082,310 A | * | 1/1992 | Bauer ...................... | 280/732 |
| 5,478,106 A | * | 12/1995 | Bauer et al. ............... | 280/728.3 |
| 5,738,367 A | * | 4/1998 | Zichichi et al. ........... | 280/728.3 |
| 5,744,776 A | * | 4/1998 | Bauer ...................... | 219/121.7 |
| 5,883,356 A | * | 3/1999 | Bauer et al. ............. | 219/121.62 |
| 5,968,381 A | * | 10/1999 | Nusshor ................ | 219/121.69 |
| 6,079,733 A | * | 6/2000 | Towler .................... | 280/728.3 |
| 6,210,614 B1 | * | 4/2001 | Gardner et al. ............. | 264/46.5 |
| 6,393,687 B1 | * | 5/2002 | Friedrich ..................... | 29/560 |
| 6,593,541 B1 | * | 7/2003 | Herren .................. | 219/121.67 |
| 6,666,630 B2 | * | 12/2003 | Zimmermann et al. ...... | 409/132 |
| 6,793,865 B2 | * | 9/2004 | Kapteyn et al. ............. | 264/400 |
| 2003/0184768 A1 | * | 10/2003 | Fujishima et al. ........... | 356/614 |
| 2005/0147476 A1 | | 7/2005 | Wieners | |

FOREIGN PATENT DOCUMENTS

DE 1459943 9/2004
WO WO 01/70445 9/2001

OTHER PUBLICATIONS

European Search Report dated May 21, 2007.

* cited by examiner

*Primary Examiner*—Dana Ross
(74) *Attorney, Agent, or Firm*—Jenkins, Wilson, Taylor & Hunt, P.A.

(57) ABSTRACT

For introducing a weakened line into a component 10, which is rigid per se and does not conform to a supporting mold or a receiving means in correspondence with the true shape, especially into an injection-molded part such as an instrument panel of an automobile, a device is provided comprising a multi-axis machine tool with a CNC-control suited for processing base-oriented programs, and a receiving means 11 for the component 10 to be processed, distance sensors 13 for the CNC-control being assigned to the receiving means to detect the actual three-dimensional position of the component.

6 Claims, 2 Drawing Sheets

METHOD AND DEVICE FOR INTRODUCING WEAKENED LINES INTO A COMPONENT RIGID PER SE

TECHNICAL FIELD

The invention relates to a method and a device for introducing weakened lines into a component which is rigid per se and does not conform to a supporting mold or receiving means in correspondence with the true shape, especially into an injection-molded part such as an instrument panel of an automobile.

BACKGROUND ART

In automobiles the protection of passengers in case of an impact by means of so-called airbag systems has meanwhile become a standard feature. It is common practice to introduce a recess into the dashboard or the instrument panel, respectively, in front of the co-driver, into which the device for the airbag is placed. For optical reasons it is common that the airbag devices are mounted invisibly. For this purpose, a material weakening is provided for the airbag of the co-driver from the rear side in the region of the instrument panel, which supports the airbag device, which weakening is sufficient to make the visible surface tear open and thereby release the airbag in the case of an accident.

The introduction of material weakenings is already known from the prior art, wherein, in the case of multi-layered instrument panels, the uppermost skin is weakened while the layers of the multipart instrument panel provided underneath the same are completely broken through. However, if the instrument panel is made of one single piece, no satisfactory solution has yet been found with respect to the introduction of a necessary weakening. In the production of injection-molded instrument panels, attempts to provide a weakening already in the injection-molded part, into which extremely thin-walled regions are introduced, have failed. This is, above all, due to the fact that the weakened regions become inevitably visible because the pressure ratios and flow behaviors in the region of extremely thin-walled spots differ to such an extent that flow marks and flow lines make the visible surface unattractive.

Previous attempts to produce a weakening in the injection-molded instrument panels from the rear side in a subsequent working cycle by means of milling a groove or a slot have not brought about any useful results, however, since the injection-molded part does not rest closely enough against the supporting mold or support. The aforementioned visible surface of the instrument panel reliably adjusts to the reference surface of a vacuum-supplied receptacle as a soft, conformable skin under the force of the air pressure. Given a rigid injection-molded part a reliable contact cannot be assumed, however, due to the molded-in stress. Accordingly, the above-mentioned, previously common processing methods fail.

An additional aspect in view of the safety is that weakened lines have to be introduced into instrument panels with a small tolerance so as to preserve a so-called residual wall thickness. The residual wall thickness is tolerated such that, on the one hand, a secure tear-out takes place in case of an accident while, on the other hand, this weakening cannot result in a visible line or even in an unintended tear-out beyond the service life of the vehicle. Accordingly, usual residual wall thickness amount to approximately 0.5 mm, and usual tolerances for these residual wall thicknesses range in the order of +/−0.03 mm. In accordance with this, it is important for the high-precision introduction of weakened lines particularly into an instrument panel of an automobile, that an exact control of the length and form of the processing tool is performed, that the tolerance of the involved axes and constructional units of the machines is observed with respect to the tool, and that the position of the support carrying the work piece or component or molded part, respectively, is taken into account.

SUMMARY OF THE INVENTION

The invention is therefore based on the object to provide a device and a method of the aforementioned kind, by means of which weakened lines with the tolerance necessary for the industrial process can be introduced also into components which do not conform to a supporting mold or receiving means.

According to the invention this object is provided by a device for introducing a weakened line into a component which is rigid per se and does not conform to the true shape of a supporting mold or a receiving means, especially into an injection-molded part such as an instrument panel of an automobile by means of milling a groove or a slot, comprising: (a) a multi-axis machine tool with a CNC-control provided for processing base-oriented programs, (b) a receiving means for the component to be processed, and (c) distance sensors being assigned to the receiving means to detect the actual three-dimensional position of the component for controlling the weakening-line introduction process and being mounted in the region of the weakened line to be introduced to measure the distance between the upper surface of the receiving means and the lower side of the component.

With respect to the method this object is provided by a method for introducing a weakened line into a component which is rigid per se and does not conform to the true shape of a supporting mold or receiving means, especially into an injection-molded part such as an instrument panel of an automobile by means of milling a groove or a slot, comprising the following steps: detecting the actual three-dimensional position of the component in the region of the weakened line to be introduced with respect to the supporting mold or receiving means by measuring the distance between the upper surface of the receiving means and the lower side of the component in the area of the processing line by means of distance sensors; displacing the processing line in correspondence with the measuring result of the distance sensors, and performing the processing by means of a CNC-controlled multi-axis machine tool.

The invention is based on the assumption that the component to be processed has basically preserved the shape of the ideal three-dimensional geometry incorporated in the receiving means. However, it is impossible to make it rest smoothly and completely against the receiving means owing to its slight deformation for reasons of heating or shrinkage tolerance.

According to the invention, the component to be processed and not resting reliably against the reference surface of a processing receiving means is measured with respect to its actual length, for which purpose distance sensors are provided in the reference surface of the receiving means, which can detect the distance between the reference surface and the work piece or component, respectively, with sufficient accuracy.

With respect thereto mechanical sensors are suitable, which contact the surface of the work piece or the component, respectively, but also non-contact sensors, which measure the distance by means of inductive or capacitive fields.

The actual three-dimensional position of the work piece or component, respectively, is preferably measured or detected with three sensors which, according to another preferred embodiment of the invention, are directly inserted in the region of the weakened line to be introduced. From the measured three coordinates the actual three-dimensional position of the work piece can be calculated by means of an efficient CNC-control, and a cutting program for the introduction of the weakened lines can be oriented and run in correspondence with this three-dimensional position. For this purpose a CNC-control is preferably used, which allows a three-dimensional rotation of an optional processing program.

According to another embodiment of the invention, sensors for the partial processing are mounted at each base or interpolation point of the CNC-program so as to adapt a work piece geometry, which compensates deformations in the three-dimensional space in the region of the weakened line, wherein the measuring result of the respective sensors then correspondingly displaces the corresponding base or interpolation point of the processing line. A base-oriented program or a program considering interpolation points for the CNC-control is preferably used for the processing.

With reference to the attached drawings the invention will be explained in more detail below.

DETAILED DESCRIPTION OF THE INVENTION

Figure 1:
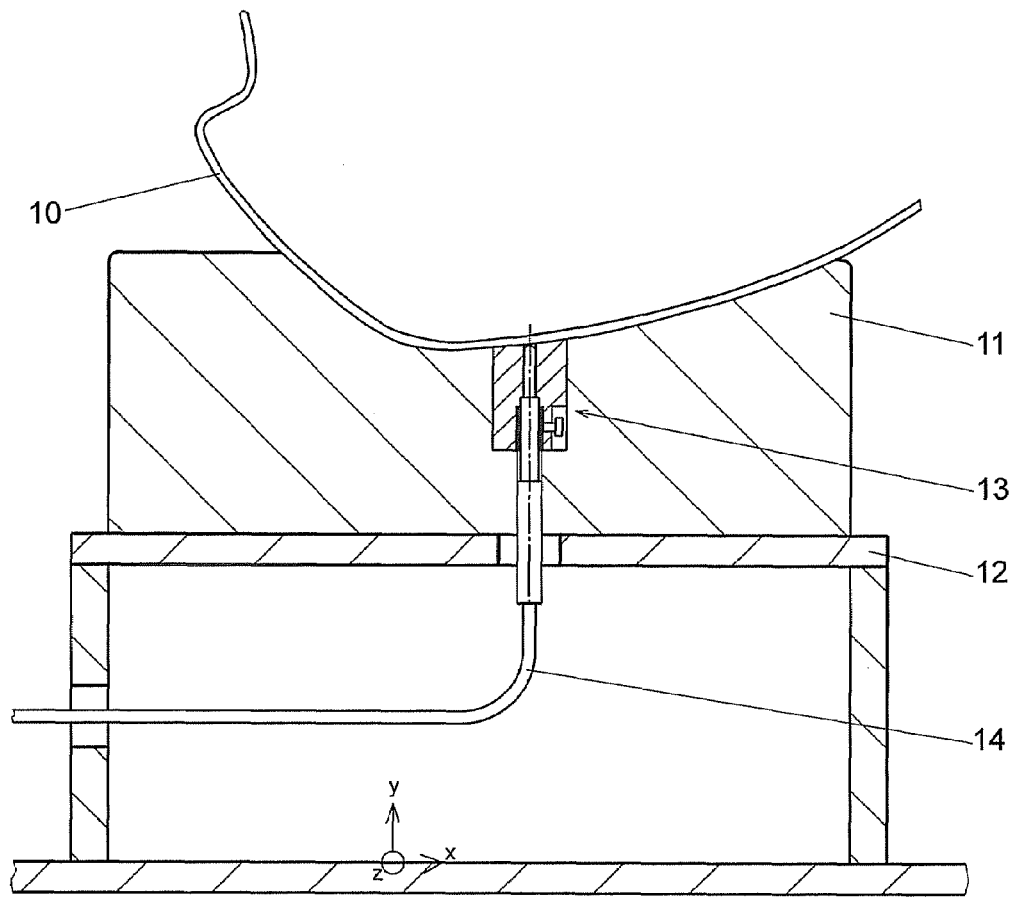
FIG. 1 shows a schematic sectional view through an injection-molded part resting on a receptacle.

FIG. 1 schematically shows a section of a component 10 consisting especially of an injection-molded instrument panel for automobiles. For the processing thereof the component 10 is mounted on a receptacle or receiving means 11, wherein the component 10 does not rest on the latter in correspondence with the true shape, however. The receptacle 11 is secured on a processing table 12 of a CNC-machine tool 22.

Figure 2:
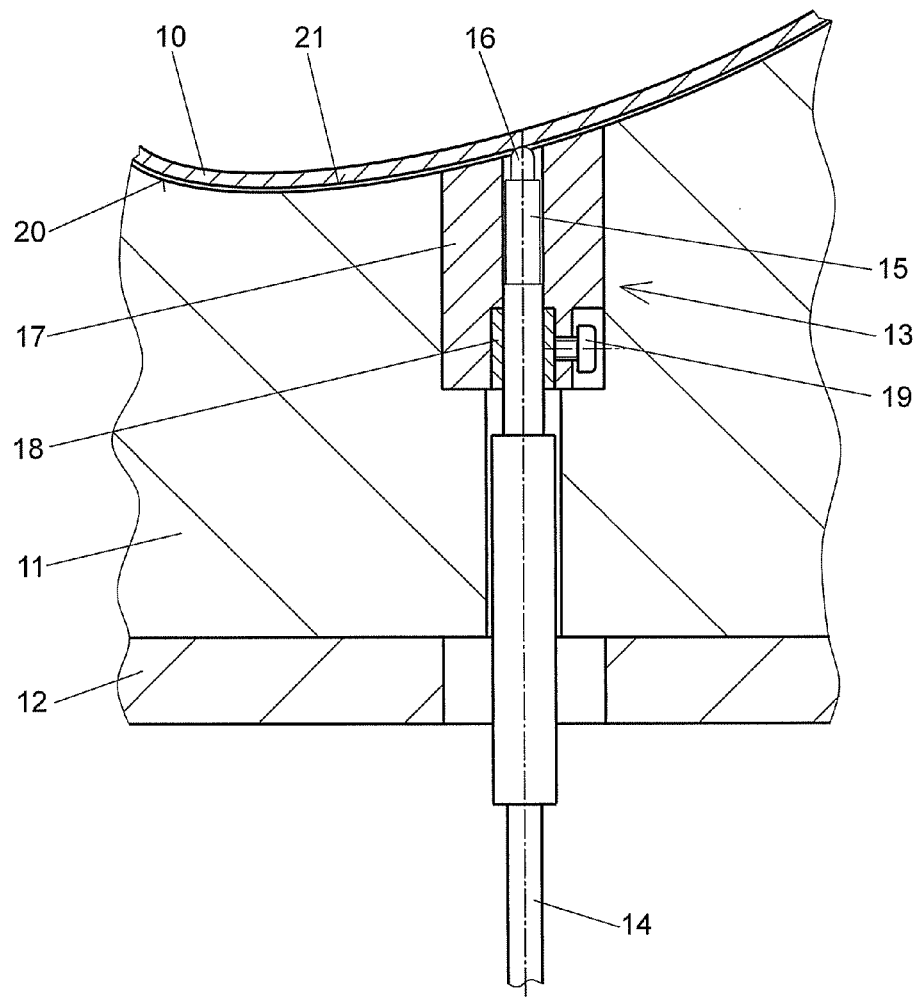
FIG. 2 shows an enlarged cut out illustration in the region of the distance sensor of FIG. 1.

A mechanical sensor 13, which is shown in FIG. 2 in more detail, is arranged in the receptacle 11 to measure the distance between the upper surface of the receptacle 11 and the lower side of the molded part 10 in the region of the intended processing for introducing or working in a weakened line 23. The distance sensor 13 supplies a measuring signal via a signal line 14 to the CNC-control 22.

FIG. 2 shows the distance sensor 13 in an enlarged view, which is formed as a measuring probe 15 with a rounded-off contact tip 16 and which is mounted in an insert 17 in a correspondingly formed bore of the receptacle 11. For securing and adjusting the distance sensor 13 in the insert 17, a clamping ring 18 and a locking screw 19 are provided.

According to FIG. 2 the rounded-off tip 16 of the distance sensor 13 detects the distance between the upper surface 20 of the receptacle 11 and the lower side 21 of the component 10 to thereby detect the actual three-dimensional position of the component and to displace the same for the subsequent processing for introducing weakened lines 23.

The invention claimed is:

1. A device for introducing a weakened line into a component which is rigid per se and does not conform to the true shape of a supporting mold or a receiving means, especially into an injection-molded part such as an instrument panel of an automobile by means of milling a groove or a slot, comprising:
    (a) a multi-axis machine tool with a CNC-control provided for processing base-oriented programs,
    (b) a receiving means for the component to be processed, and
    (c) distance sensors being assigned to the receiving means to detect the actual three-dimensional position of the component for controlling the weakening-line introduction process and being mounted in the region of the weakened line to be introduced to measure the distance between the upper surface of the receiving means and the lower side of the component.

2. The device according to claim 1, wherein the distance sensors are provided at interpolation points for the CNC-processing.

3. The device according to claim 1, wherein the distance sensors are formed as mechanically working and/or non-contact sensors.

4. The device according to claim 1, wherein three distance sensors are provided.

5. A method for introducing a weakened line into a component which is rigid per se and does not conform to the true shape of a supporting mold or receiving means, especially into an injection-molded part such as an instrument panel of an automobile by means of milling a groove or a slot, comprising:
    (a) detecting the actual three-dimensional position of the component in the region of the weakened line to be introduced with respect to the supporting mold or receiving means by measuring the distance between an upper surface of the receiving means and a lower side of the component in the area of a processing line by means of distance sensors;
    (b) displacing the processing line in correspondence with a measuring result from the distance sensors; and
    (c) performing the processing is by means of a CNC-controlled multi-axis machine tool.

6. The method according to claim 5, wherein the processing is performed by means of interpolation points.

* * * * *